United States Patent [19]

Huhn

[11] 4,198,064
[45] Apr. 15, 1980

[54] SHAFT SEAL

[75] Inventor: Dieter Huhn, Bromma, Sweden

[73] Assignee: Gustav Huhn AB, Stockholm, Sweden

[21] Appl. No.: 956,342

[22] Filed: Oct. 31, 1978

[51] Int. Cl.² ............................................. F16J 15/32
[52] U.S. Cl. .................................... 277/152; 277/34.6
[58] Field of Search ..................... 277/152, 153, 34.3, 277/34.6

[56] References Cited

U.S. PATENT DOCUMENTS

| | | | |
|---|---|---|---|
| 3,591,963 | 7/1971 | Kopp | 277/34.3 |
| 3,687,464 | 8/1972 | Jackson | 277/153 |
| 3,825,271 | 7/1974 | Bellastio | 277/152 |
| 3,847,453 | 11/1974 | Herbert | 277/34.3 |
| 3,920,250 | 11/1975 | Eklund | 277/152 |
| 4,125,266 | 11/1978 | Schonherr | 277/153 |

Primary Examiner—Robert I. Smith

[57] ABSTRACT

A means for sealing shafts, which withstands a high operating pressure and which can also be used with relatively large shaft diameters. The means mainly consists of a sealing ring with two flange rings of the same diameter, said flange rings being axially separated from each other by an intermediate ring, and being pressed in a sealing manner between a pressure ring and an idle wall. Both flange rings are canted and join to form a sealing lip lying against the shaft. The one flange ring is supported by the idle wall which can lead off the compressive forces.

4 Claims, 3 Drawing Figures

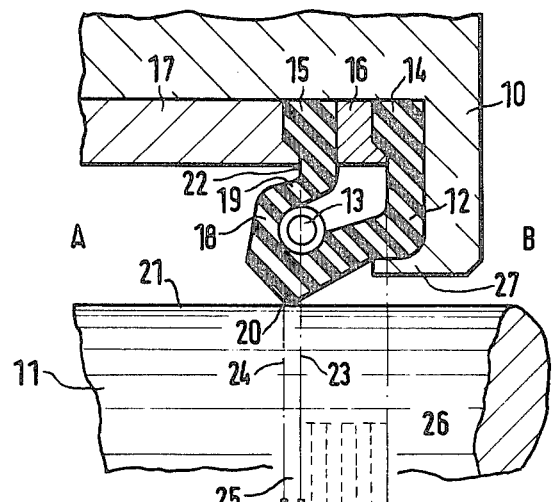
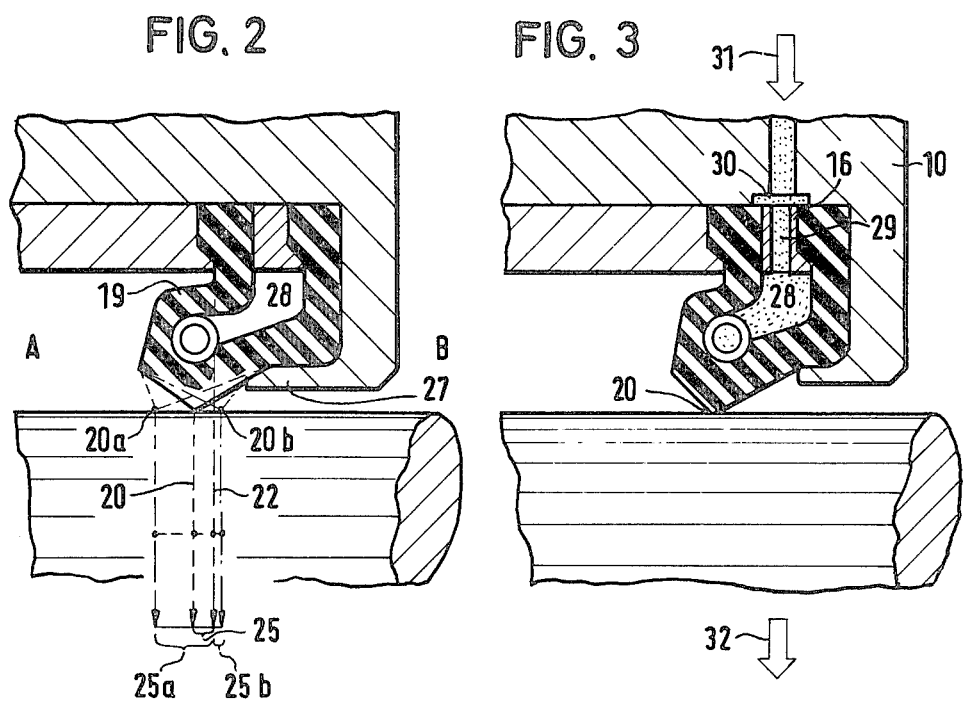

SHAFT SEAL

BACKGROUND OF THE INVENTION

Seals for shafts with rotating, helical or reciprocating motion function either axially, so called axial face seals, or radially. A good sealing effect is obtained if the mass of those sealing parts following the radial and axial movements is as small as possible. Here radial seals have decisive advantages as opposed to axial face seals, as the agitated mass of said radial seals only amounts to a fraction of that of an axial face seal.

It is known to seal even large shafts with diameters greater than one meter with radial and axial face seals of various types. One type of radial seal frequently used, is the shaft seal ring consisting of a rubber lip which abuts in a sealing manner against the shaft periphery under a radially inwards directed force which is generated by a helical spring closed to form a ring. The rubber part is idle, and inserted into the idle machine part with its outer periphery acting in a sealing manner. With the self-elasticity of the rubber material and with the lever existing between the sealing lip and the adjustment in the idle machine part, the shaft sealing ring can absorb certain inclined positions and radial vibrations as well as frequently occurring excentricity of the shaft against the idle machine part.

The design of such a shaft sealing ring preferrably used hitherto, is however limited in view of the shaft diameter and in view of the operating pressure in the medium to be sealed. Attempts have been made to obtain a better sealing effect with higher pressures by means of a thrust ring on the low pressure side, behind the sealing lip and thus preventing a protrusion of the elastic lip in the gap between the shaft and the idle machine part. By flanging or pressing the sealing ring in the casing, said sealing ring can follow the radial displacements of the shaft, resulting from wear of the supporting bearing, from excentricity caused by false, incorrect installation or from shock-like occuring radial forces. With such a positioning error of the shaft, the seal is very strongly pressed together by the shaft on one side and the sealing lip loses contact with the shaft at the diametrically opposite point, despite the certain equalization caused by the elasticity of the material of the sealing lip. A result thereof is a severe leakage where the lip no longer has sealing contact with the shaft on the one hand, and an intensive wear of the shaft caused by an enforced contact pressure at the diametrically opposite point on the other hand.

SUMMARY OF THE INVENTION

According to the present invention, the essential characteristics of which are stated in the patent claims, a seal is accomplished preventing the disadvantages described above. The seal is a radial seal based on the fundamental construction of the shaft sealing ring described above. A wall of elastic material is radially pulled outwards from the sealing lip which is radially inwardly acted upon by the described helical spring, said wall being formed with a curvature, whereupon the wall is clamped further radially outwards between two rings and is thus mounted in the idle machine part. With this arrangement, a hydraulic relief of the pressure of the medium to be sealed, acting upon the sealing lip, is obtained as well as a damping of the hydraulic and the mechanical vibrations acting on the sealing lip, through the air bubble enclosed between the two radially place walls of the sealing arrangement, which has a damping effect on the vibrations.

The following further describes the invention with reference to the attached drawings showing various embodiments thereof.

As described above, the sealing ring has a radially outwards pulled wall which is mounted in the idle machine part. There is thus a possibility to alter the hydraulic relief of the pressure of the medium as required, without altering the installation dimensions of the seal or its elastic attachment, in that the sealing lip is axially arranged in relation to the idle machine part at a variable distance.

The air bubble formed between the two radially arranged walls of the seal can be acted upon with cooling liquid or cooling gas through holes, and thus contributes to an effective dissipation of the frictional heat forming at the sealing lip.

BRIEF DESCRIPTION OF THE DRAWINGS

FIG. 1 shows a cross section through the upper half of a sealing ring;

FIG. 2 shows a similar section through a modified embodiment;

FIG. 3 shows the same design as FIG. 1 with the addition of a cooling fluid for the sealing lip and ring.

DESCRIPTION OF THE DRAWINGS

The seal depicted in FIG. 1, serves the purpose of sealing a shaft 11 between two spaces A and B which are separated from each other by a separating wall 10. The device consists of a sealing ring 12 and a helical spring 13 inserted therein and closed to form a ring. Between the two walls 14 and 15 of the sealing ring 12, is arranged an intermediate ring 16 of metal or plastic material, and the sealing ring 12 as well as the intermediate ring 16 are axially fastened to the separating wall 10 with screws or threads via a thrust ring 17. Contrary to known embodiments, the sealing ring 12 has a radial wall 18 followed further radially outwards by a curvature 19 which then further radially outwards becomes the flange 15. The sealing ring 12 seals with its sealing lip 20 the periphery of the shaft under the radial force of the spring 12 and under the pressure of the medium in space A. Contrary to earlier designs, the hydraulic pressure acting upon the sealing lip 20 can be controlled in that the flange 15 is arranged at variable axial distance to the wall 14, said flange 15 thus bringing its front surface 22 into a plane 24 described by the line of contact of the sealing lip 20 with the periphery of the shaft. As can be seen from FIG. 1, the force exerted on the sealing lip by the pressure of the medium and portrayed by the force rectangle 25, is significantly smaller than the force portrayed by the force rectangle 26 as is generated by hitherto conventional designs of shaft sealing rings.

FIG. 2 shows a different way of controlling the hydraulic pressure on the sealing lip. While the radial fastenings are maintained by the flanges 14 and 15, the line of contact of the sealing lip 20 with the periphery of the shaft has been shifted so that the contact occurs along a line of contact 20a and the force rectangle 25a thus obtained, becomes significantly larger than the original force rectangle 25 according to FIG. 1.

The force acting on the sealing lip can also be reduced or even eliminated in that the line of contact according to FIG. 2 is axially shifted close to or beyond the line of attachment 22 and thus contacting the periphery of the shaft along a line 20b. The corresponding force rectangle 25b tends to lift the sealing lip from the periphery of the shaft, as the rectangle behind the line of attachment 22 is then situated in the direction of pressure towards the space B.

A different embodiment of the curvature 19 is also portrayed in FIG. 2, showing a greater axial expansion than that in FIG. 1, and thus creating an improved flexibility in the sealing ring through the larger levers towards the flanges 14 and 15. The volume of the enclosed air bubble 28 is also enlarged, said bubble having a damping effect on the hydraulic vibrations as well as on the mechanical vibrations arising in the surrounding machine parts.

In FIG. 3 the sealing ring 12 has the same design as in FIG. 1, but the air bubble is used for cooling the sealing lip and the sealing ring, in that cold gas or cold liquid flows from an inlet 31 and via an annular space 30 in the wall 10 and a number of holes 29, through the space 28 and leaves the seal via a corresponding outlet 32.

What is claimed is:

1. Sealing means for shafts with rotating, helical or reciprocal motion, said sealing means comprising the combination of a shaft sealing ring of elastic or plastic material having a sealing lip that is adapted to be placed in sealing contact with the outer surface of the shaft and a body lying around the sealing lip with a radially inwardly acting spring force, said shaft sealing ring including first and second axially separated flanges one of which is nearer the medium to be sealed than the other and an intermediate ring, said flanges being adapted to be clamped with a sealing effect between a pressure ring and a fixed wall, there being further included a curved wall extending substantially radially between said sealing lip and said flange nearest the medium to be sealed to thereby maintain the elastic attachment to the fixed wall, said sealing lip being situated at a small axial distance from said flange nearest the medium to be sealed to thereby at least partly relieve said sealing means from pressure of the medium to be sealed.

2. Sealing means according to claim 1 the space enclosed by said shaft sealing ring, said flanges thereof and said intermediate ring is filled with a medium of significantly lower viscosity than the medium to be sealed, said medium in the enclosed space being adapted to absorb hydraulic and the mechanical vibrations generated in said sealing means and in the neighboring machine parts.

3. Sealing means according to claim 1 wherein said sealing lip lies at an axially variable distance from the plane of said sealing ring flange nearest and facing the medium to be sealed thus permitting the alteration of the force generated by the pressure of the medium to be sealed on said sealing lip.

4. Sealing means according to claim 1 the space enclosed by said shaft sealing ring, said flanges thereof and said intermediate ring is in fluid connection with a cooling medium which flows through the enclosed space via an inlet and an outlet and dissipates the frictional heat generated at said sealing lip.

* * * * *